(12) United States Patent
Yamamoto et al.

(10) Patent No.: US 8,731,246 B2
(45) Date of Patent: May 20, 2014

(54) MOTION VECTOR DETECTION DEVICE, APPARATUS FOR DETECTING MOTION VECTOR AND MOTION VECTOR DETECTION METHOD

(75) Inventors: Takuma Yamamoto, Tokyo (JP); Nao Mishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 143 days.

(21) Appl. No.: 13/221,938

(22) Filed: Aug. 31, 2011

(65) Prior Publication Data

US 2012/0057760 A1    Mar. 8, 2012

(30) Foreign Application Priority Data

Sep. 2, 2010    (JP) .................................. 2010-196984

(51) Int. Cl.
*G06K 9/00*    (2006.01)

(52) U.S. Cl.
USPC ......................................................... 382/107

(58) Field of Classification Search
None
See application file for complete search history.

(56) References Cited

U.S. PATENT DOCUMENTS

| | | | |
|---|---|---|---|
| 6,430,317 B1 * | 8/2002 | Krishnamurthy et al. .... | 382/236 |
| 6,567,469 B1 * | 5/2003 | Rackett ..................... | 375/240.16 |
| 6,931,065 B2 * | 8/2005 | Kim .......................... | 375/240.16 |
| 7,555,166 B2 | 6/2009 | Lee et al. | |
| 2003/0053545 A1 * | 3/2003 | Lainema et al. ......... | 375/240.16 |
| 2005/0249426 A1 * | 11/2005 | Badawy ........................ | 382/241 |
| 2010/0086050 A1 * | 4/2010 | Badawy ................... | 375/240.16 |
| 2012/0057760 A1 * | 3/2012 | Yamamoto et al. ........... | 382/107 |
| 2012/0128071 A1 * | 5/2012 | Celetto et al. ............ | 375/240.16 |

OTHER PUBLICATIONS

Yamamoto et al., "High-accuracy motion estimation with 4-D recursive search block matching", 2012 IEEE 1st Global Conference on Consumer Electronics (GCCE), Date of Conference: Oct. 2-5, 2012, pp. 625-628.*
De Haan et al., True-motion estimation with 3-D recursive search block matching, IEEE Transactions on Circuits and Systems for Video Technology, Oct. 1993, vol. 3, Issue: 5, pp. 368-379, 388.*
Background Art Information Sheet provided by applicants (Jan. 20, 2011) (1 page total).

* cited by examiner

*Primary Examiner* — Tahmina Ansari
(74) *Attorney, Agent, or Firm* — Posz Law Group, PLC

(57) ABSTRACT

A motion vector detection device includes: a matching error calculation part that calculates matching errors between a focus block and each of reference blocks; a least matching error calculation part calculating a least matching error from among the matching errors; a threshold calculation part calculating a threshold value; a correction vector calculation part calculating a correction vector from motion vectors detected in the reference blocks; and a motion vector determination part determining, as a motion vector for the focus block, a relative position vector in a block in which the relative position vector with respect to the focus block is the closest to the correction vector, the block being selected from among the reference blocks in which a difference between the plurality of matching errors and the least matching error is within the threshold value.

22 Claims, 5 Drawing Sheets

MOTION VECTOR DETECTION DEVICE, APPARATUS FOR DETECTING MOTION VECTOR AND MOTION VECTOR DETECTION METHOD

CROSS REFERENCE TO RELATED APPLICATION

This application is based upon and claims the benefit of priority from the prior Japanese Patent Application No. 2010-196984, filed Sep. 2, 2010, the entire contents of which are incorporated herein by reference.

BACKGROUND

1. Technical Field

Embodiments described herein relate generally to a motion vector detection device, an apparatus for detecting a motion vector and a motion vector detection method.

2. Description of the Related Art

In general, in a motion search using block matching, a current frame is divided into grid blocks, and a search for a motion vector is conducted for each block. The block in which the motion vector is searched is hereinafter referred to as a focus block. Another block with which the focus block is compared is referred to as a reference block. A frame to which the reference block belongs is a reference frame. In the block matching method, one of the reference blocks with the least (smallest) matching error with respect to the focus block is searched from a reference frame, and a relative position vector between the reference block and the focus block is detected as a motion vector. In the block matching method, a sum of squared difference (SAD) or a sum of squired difference (SSD) is often used as the matching error. The current frame is one frame of a moving image data, and should be displayed as a screen at present time by a monitor, that is TV, Personal Computer and so on. In this case, the current frame is an input frame.

When a cyclically repetitive pattern is included in the input frame, small SAD values may be calculated in some reference blocks. In the block matching using the SAD values, an incorrect motion vector may be detected. And then, there is a technique to determine whether or not the focus block includes the repetitive pattern, based on pattern analysis using horizontal and vertical projection histograms for a SAD map, in which a candidate vector and the matching error are associated with each other. The technique also corrects the incorrect motion vector using an average vector of the motion vectors that have been detected from blocks around the focus block. However, because the horizontal and vertical projection histograms are used, the determination regarding whether or not the focus block includes the repetitive pattern cannot be performed for vectors in diagonal directions, and therefore accurate motion vectors cannot be detected.

One of the objects disclosed in the present application is to provide a motion vector detection device, program for the device, or a method thereof, which is configured to determine a motion vector with minimal errors.

DETAILED DESCRIPTION OF EMBODIMENTS

A motion vector detection device according to an embodiment(s) is described below.

Figure 1:
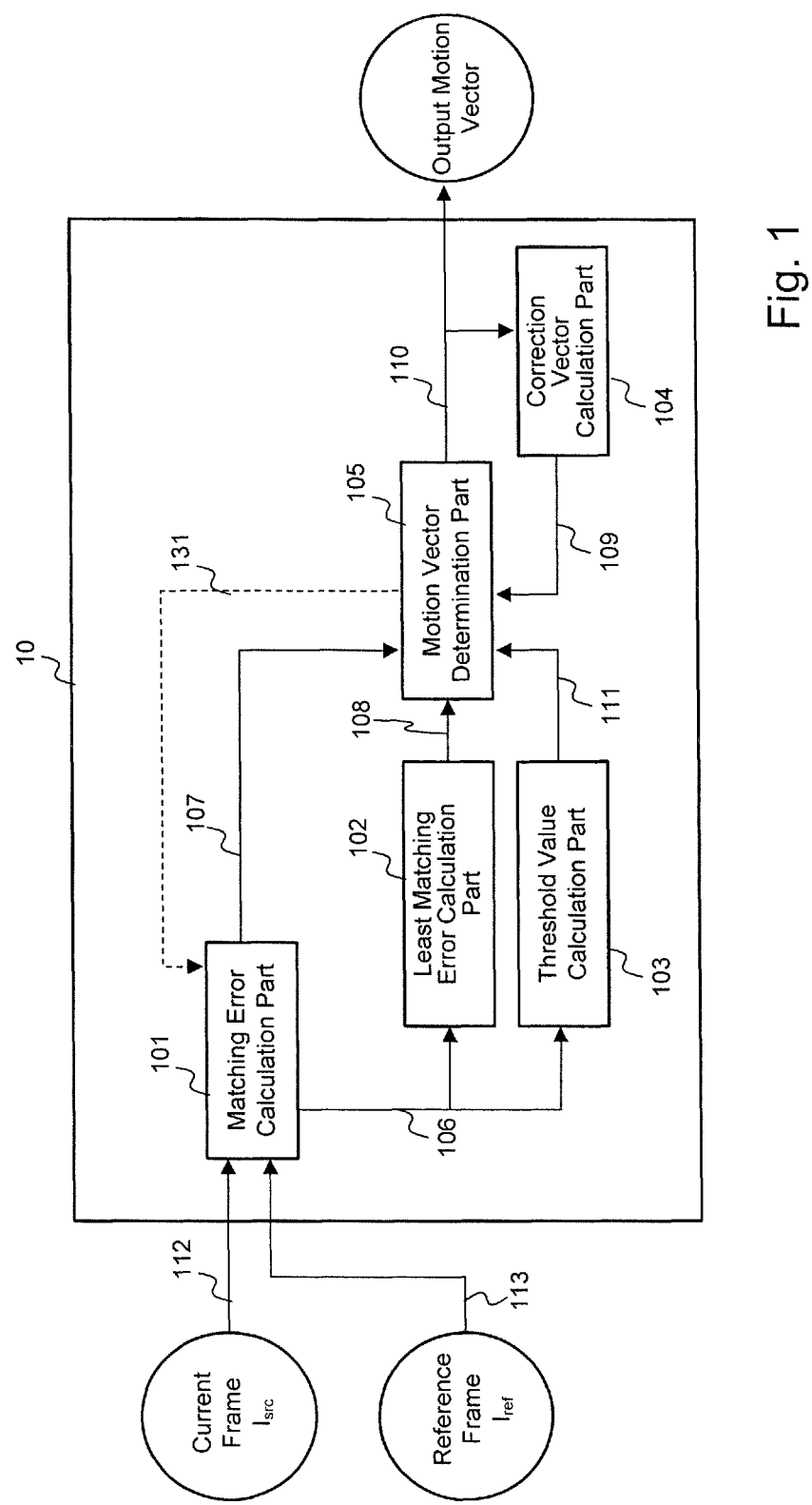
FIG. 1 is a block diagram of a motion vector detection device according to an exemplary embodiment.

FIG. 1 is a block diagram of a motion vector detection device according to the present embodiment.

A motion vector detection device 10 of the present embodiment includes a matching error calculation part 101 that calculates matching errors between a focus block and reference blocks, a least matching error calculation part 102 that calculates a least matching error, a threshold value calculation part 103 that calculates a threshold value, a correction vector calculation part 104 that calculates a correction vector based on a motion vector of a block in which a motion has been detected, and a motion vector determination part 105 that determines a motion vector of the focus block based on the correction vector and the threshold value.

The matching error calculation part 101 calculates a plurality of matching errors between the focus block in the current frame and each of a plurality of reference blocks provided in a reference frame. The least matching error calculation part 102 calculates the least matching error from among the matching errors determined by the matching error calculation part 101. The threshold value calculation part 103 calculates a threshold value such that the threshold value increases as the variation of the matching errors becomes greater. The correction vector calculation part 104 calculates a correction vector from one or more motion vectors detected in one or more blocks from which motion vectors were determined prior to the focus block of the current frame. The motion vector determination part 105 determines, as a motion vector for the focus block, a relative position vector in a block in which the relative position vector with respect to the focus block is the closest to the correction vector, the block being selected from among the reference blocks in which a difference between the matching errors and the least matching error is within the threshold value.

Figure 2:
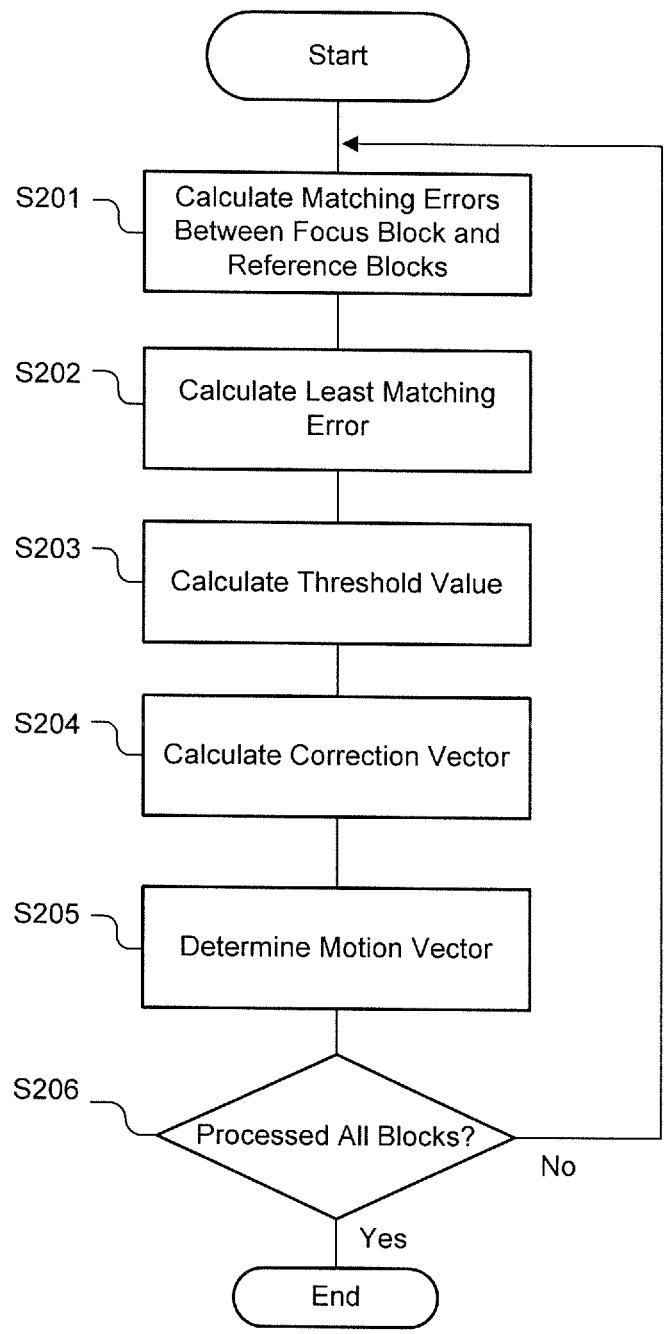
FIG. 2 is a flow diagram illustrating exemplary steps of the embodiment.

FIG. 2 is a flow diagram illustrating exemplary steps of the embodiment.

The matching error calculation part 101 determines a SAD map 107 in addition to calculating matching errors 106 between the focus block and the reference blocks (S201). The current frame 112 and the reference frame 113 are input to the matching error calculation part 101. The current frame 112 and the reference frame 113 are different frames. $C_d$, which is a set of the matching errors between the focus block and the reference blocks provided in the reference frame, is calculated based on following Equation 1.

$$C_d = \{D(u) | u \in C\} \qquad \text{Equation 1}$$

In Equation 1, $D(u)$ represents a matching error when a motion vector u is assigned to the focus block, and C represents a set of search candidate vectors. For instance, for the set C of the search candidate vectors (or vectors to be searched), a set of relative position vectors of pixels in certain areas centering around the focus block may be used. Alternatively, the motion vectors detected in blocks around the focus block, the motion vectors detected around a block in a past frame that corresponds to the focus block, and the motion vectors calculated based on a pixel unit in which the current frame and the reference frame are respectively reduced, may be used as the search candidate vectors. The past frame is the former of the current frame in time series, or should be displayed before present time by a monitor. In that case, the motion vector 110 output from the motion vector determination part 105 is further input to the matching error calculation part 101 (see 131 in FIG. 1). The matching error D(u) may be calculated, for example, based on following Equation 2:

$$D(u) = \sum_{x \in B} |I_{ref}(x+u) - I_{src}(x)| \qquad \text{Equation 2}$$

In Equation 2, B represents a set of position vectors indicating pixel positions in the focus block, $I_{src}$ represents the current frame 112, and $I_{ref}$ represents the reference frame 113. The matching error D(u) is not limited to a value calculated by Equation 2 but may be a value calculated by following Equation 3 or 4:

$$D(u) = \sum_{x \in B} (I_{ref}(x+u) - I_{src}(x))^2 \qquad \text{Equation 3}$$

$$D(u) = \frac{1}{|B|} \sum_{x \in B} |I_{ref}(x+u) - I_{src}(x)| \qquad \text{Equation 4}$$

|B| in Equation 4 represents an element count of the set B of the position vectors.

Figure 3:
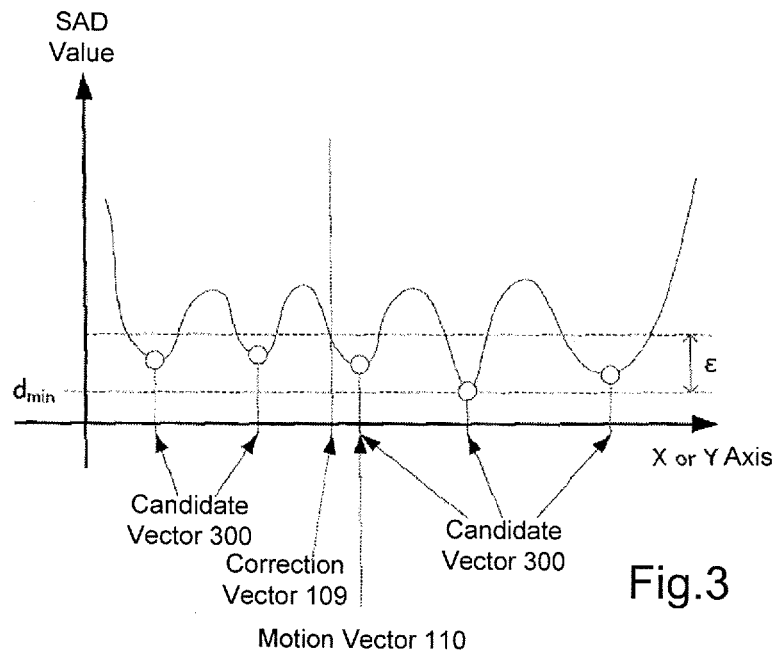
FIG. 3 is a schematic diagram representing content processed by the embodiment.

FIG. 3 is a schematic diagram of the SAD map 107 output from the matching error calculation part 101. The SAD map 107 is one piece of data in which the matching error corresponds to the search candidate vector. The SAD map 107 is normally represented in three dimensional format. However, for the purpose of simplifying the explanation, the SAD map 107 is represented in two dimensional format in FIG. 3. In FIG. 3, the horizontal axis represents a relative position that a candidate searched vector indicates, and the vertical axis represents a SAD value corresponding to the relative position. The curve shown in FIG. 3 represents the calculated matching errors. The following explanations are made with reference to FIG. 3.

The least matching error calculation part 102 calculates the least matching error 108 based on the input matching errors 106 (S202). The least matching error calculation part 102 calculates the least matching error 108 ($d_{min}$), which is the least value of the elements in the set $C_d$ of the matching errors based on following Equation 5:

$$d_{min} = \min_{d \in C_d}(d) \qquad \text{Equation 5}$$

Min( ) of Equation 5 is an operator for determining the least value.

The threshold value calculation part 103 calculates a threshold value 111 based on the input matching errors 106 (S203). The threshold value calculation part 103 first calculates a variance $\sigma_d$ of the matching errors 106 based on following Equation 6:

$$\sigma_d = \frac{1}{|C_d|} \sum_{d \in C_d} (d - \mu_d)^2 \qquad \text{Equation 6}$$

$\mu_d$ of Equation 6 is an average value of the matching errors 106, which is calculated by following Equation 7:

$$\mu_d = \frac{1}{|C_d|} \sum_{d \in C_d} d \qquad \text{Equation 7}$$

Next, a threshold value 111 ($\epsilon$) is calculated based on following Equation 8:

$$\epsilon = \tau \sigma_d \qquad \text{Equation 8}$$

Figure 5:
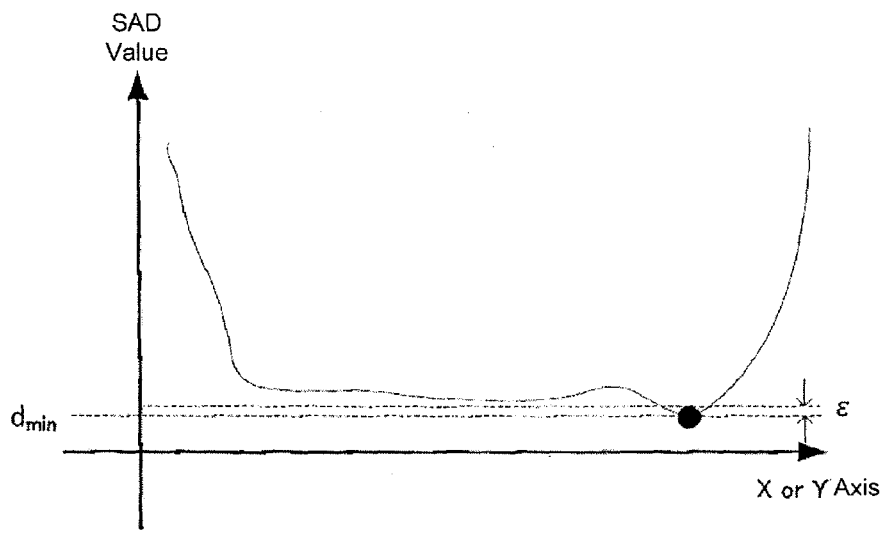
FIG. 5 illustrates a condition in which a threshold value becomes smaller as a level of variation of the matching errors decreases.

$\tau$ of Equation 8 is a constant. For example, $\tau$ may be from 0 to 1.0. By setting the threshold value proportional to the variance $\sigma_d$, the threshold 111 can dynamically vary in response to the variation of the matching errors 106. Therefore, erroneous detection of vectors in a region in which luminance do barely changes is prevented. For example, the SAD map for the region in which the luminance barely changes is shown in FIG. 5, in which the threshold value 111 ($\epsilon$) decreases as the variation of the matching errors 106 becomes smaller. In addition, the threshold value 111 ($\epsilon$) may be calculated using a difference between the maximum value and the minimum value of the matching errors in accordance with following Equation 9:

$$\epsilon = \tau |d_{min} - d_{max}| \qquad \text{Equation 9}$$

$d_{max}$ of Equation 9 is the maximum value of the matching errors, and is calculated in accordance with following Equation 10:

$$d_{max} = \max_{d \in C_d}(d) \qquad \text{Equation 10}$$

Max( ) of Equation 10 is an operator for determining the maximum value. Alternatively, the threshold value 111 ($\epsilon$) may be calculated in accordance with following Equation 11:

$$\varepsilon = \tau \sum_{i=1}^{|C_d|} |d_i - d_{i+1}| \qquad \text{Equation 11}$$

$d_i$ of Equation 11 represents the i-th element in the set $C_d$ of the matching errors.

Figure 4:
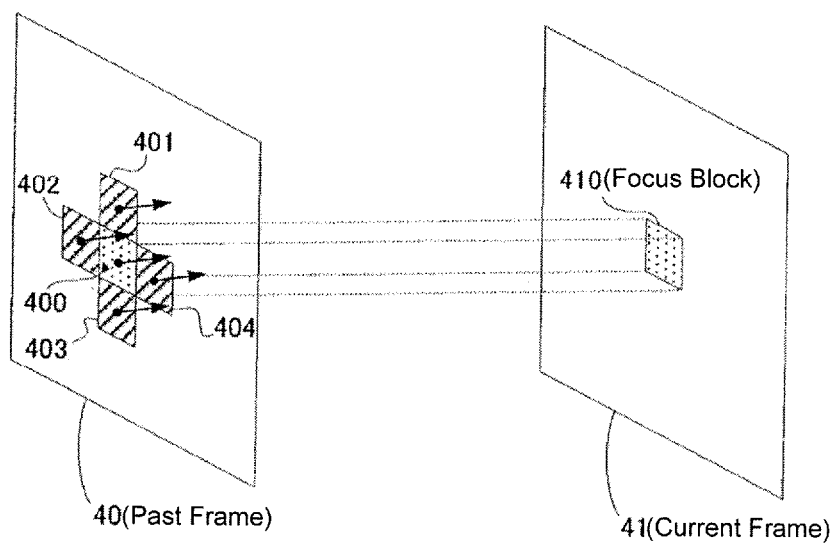
FIG. 4 is a supplementary diagram explaining a process to determine a correction vector from a past frame.

At S204, in which the correction vector is calculated, the motion vector 110 determined by the later-discussed motion vector determination part 105 is input to the correction vector calculation part 104, and the correction vector 109 is determined. The correction vector 109 is calculated in accordance with Equation 12. FIG. 4 illustrates positional relationships of the blocks that are referenced for determining the correction vector 109. The correction vector 109 is an average of the motion vectors 110 detected with respect to blocks 401, 402, 403 and 404 around a block 400 in a past frame 40 that corresponds to the focus block 410 in the current block 41.

$$u_{amd1}(b) = \frac{1}{|L_1(b)|} \sum_{p \in L_1(b)} u_{t-1}(p) \qquad \text{Equation 12}$$

In Equation 12, $u_{amd1}(b)$ is the correction vector 109, b is a position vector of the focus block, $u_{t-1}(p)$ is the motion vector 110 of a position vector p, which is assigned to a block in the past frame, and $L_1(b)$ is a set of the position vectors for blocks around a block of a position vector b. $L_1(b)$, for example, may be defined with the block of the position vector b and four blocks (upper, lower, left and right side blocks) adjacent to the block of the position vector b, as represented by following Equation 13:

$$L_1(b) = \left\{ b, b + \begin{bmatrix} 0 \\ -1 \end{bmatrix}, b + \begin{bmatrix} -1 \\ 0 \end{bmatrix}, b + \begin{bmatrix} 1 \\ 0 \end{bmatrix}, b + \begin{bmatrix} 0 \\ 1 \end{bmatrix} \right\} \qquad \text{Equation 13}$$

Because the motion vector is defined for each block, the position vector b of a block is represented by a coordinate system using the block as the minimal unit. $L_1(b)$ only needs to be around the block of the position vector b; alternatively, any eight peripheral blocks adjacent to the block of the position vector b may be available, or, for the correction vector 109, $U_{amd2}(b)$ in Equation 14 may be used. That is, an average of the motion vectors 110 detected from the current frame, instead of the motion vectors in the past frame, may be used.

$$u_{amd2}(b) = \frac{1}{|L_2(b)|} \sum_{p \in L_2(b)} u_t(p) \qquad \text{Equation 14}$$

Figure 6:
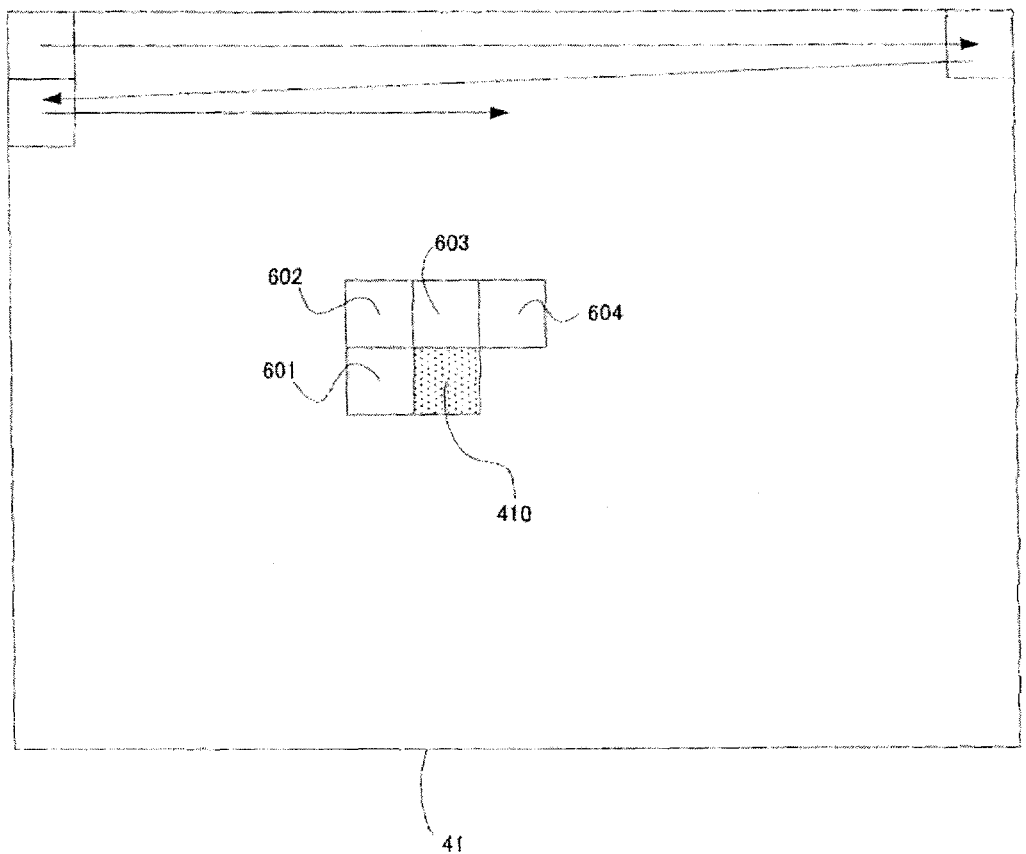
FIG. 6 is a supplementary diagram explaining a process to determine a correction vector from a current frame.

$L_2(b)$ of Equation 14 is a set of the position vectors for blocks around the block of the position vector b. FIG. 6 illustrates an exemplary case where the motion vector for each block in a screen is calculated in raster scanning order. Each of the motion vectors of blocks 601, 602, 603 and 604, which are located on the left side, the upper left side, the upper side and the upper right side seen from the focus block 410, has already been detected. Therefore, $L_2(b)$ may be defined by following Equation 15, for example:

$$L_2(b) = \left\{ b + \begin{bmatrix} -1 \\ 0 \end{bmatrix}, b + \begin{bmatrix} -1 \\ -1 \end{bmatrix}, b + \begin{bmatrix} 0 \\ -1 \end{bmatrix}, b + \begin{bmatrix} 1 \\ -1 \end{bmatrix} \right\} \qquad \text{Equation 15}$$

As the correction vector 109, an average vector of all motion vectors detected in the past frame may be used. Alternatively, a median vector of the motion vectors 110 detected in the past frame may be used.

At S205, the motion vector determination part 105 determines the motion vector 110 based on the least matching error 108, the threshold value 111 and the SAD map 107. The motion vector determination part 105 determines a candidate block from the reference blocks. The difference between the least matching error 108 and the matching error of the candidate block is equal to or less than the threshold value. The motion vector determination part 105 determines, as the motion vector 110 ($u_{out}$) of the focus block, a candidate vector 300 with the smallest difference with respect to the correction vector 109 among the candidate vectors 300 between the candidate blocks and the focus block (see FIG. 3). The candidate vector 300 exists in a block in which the matching error becomes locally the smallest. The motion vector 110 ($u_{out}$) is determined based on following Equation 16:

$$u_{out} = \underset{u \in C_\varepsilon}{\arg\min} \| u - u_{amd} \| \qquad \text{Equation 16}$$

In Equation 16, $u_{amd}$ is the correction vector 109 (i.e., $u_{amd1}$ and $u_{amd2}$) calculated by the correction vector calculation part 104, "$\| \ \|$" (see $\|u - u_{amd}\|$ of Equation 16, for example) is a norm for vector x, such as an L1 norm or L2 norm, and $C_\varepsilon$ is a set of the candidate vectors respectively corresponding to the candidate blocks, which is defined by following Equation 19:

$$C_\varepsilon = \{ u | u \in C, D(u) - d_{min} \leq \varepsilon \} \qquad \text{Equation 17}$$

At S206, a determination is made as to whether or not the process has completed for all blocks. If so (Yes, S206), the process ends. If not (No, S206), the process returns to S201.

As described above, the motion vector detection device according to the present embodiment selects a motion vector that is closest to a correction vector by processing the SAD map by a threshold value. As a result, errors due to effects by a shape of texture can be suppressed.

Figure 7:
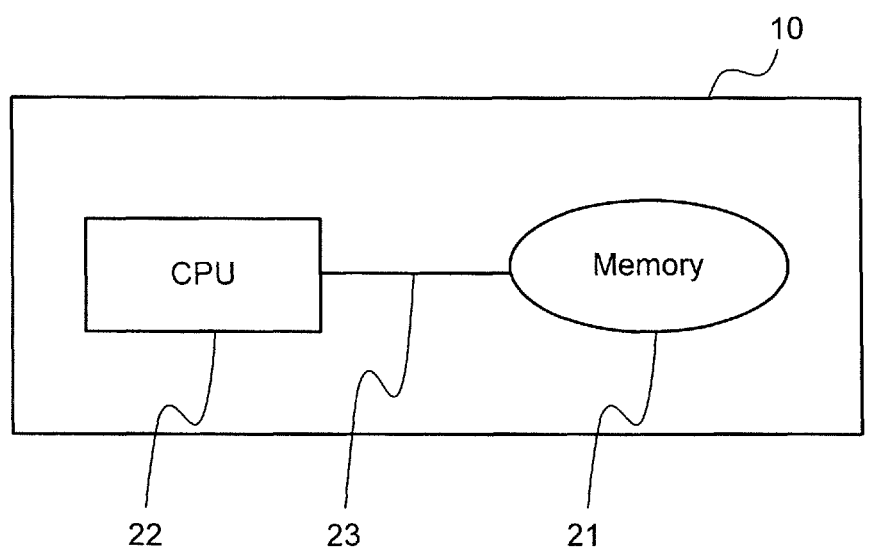
FIG. 7 illustrates an exemplary structure of a motion vector detection device.

The motion vector detection device may be realized by using a general purpose computer device, for example, as basic hardware. That is, the matching error calculation part 101, the least matching error calculation part 102, the threshold calculation part 103, the correction vector calculation part 104 and the motion vector determination part 105 may be realized by executing a computer program on a processor equipped in the computer device. FIG. 7 shows such a structure. The above parts are stored in a memory 21 and executed at a central processing unit (CPU 22) as a processor that connects the memory 21 through a bus 23. In that case, the motion vector detection device may be realized by installing a computer program on the computer device in advance. Alternatively, the motion vector detection device may be stored in a storage medium, such as a compact-disc-read-only-memory (CD-ROM) or distributed via a network in the form of a computer program, and the computer program may be installed in the computer device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and the spirit of the inventions.

What is claimed is:
1. A motion vector detection device, comprising:
a processor; and
a memory containing a program, the program, when executed, causing the processor to function as:
a matching error calculation part that calculates a plurality of matching errors between a focus block in a current frame and each of a plurality of reference blocks in a reference frame;
a least matching error calculation part that calculates a least matching error from among the plurality of matching errors;

a threshold calculation part that calculates a threshold value that increases as a variation of the plurality of matching errors becomes greater;

a correction vector calculation part that calculates a correction vector from motion vectors detected in the other focus blocks from which motion vectors were detected prior to the focus block of the current frame; and a motion vector determination part that determines, as a motion vector for the focus block, a relative position vector in a block in which the relative position vector with respect to the focus block is the closest to the correction vector, the block being selected from among the reference blocks in which a difference between the plurality of matching errors and the least matching error is within the threshold value, wherein the matching error calculation part calculates each of the plurality of matching errors as follows:

$$D(u) = \sum_{x \in B} |I_{ref}(x+u) - I_{src}(x)|$$

where D(u) represents a matching error with respect to motion vector u, $I_{ref}$ represents the current frame, $I_{src}$, represents the reference frame, B represents a set of position vectors indicating pixel positions in the focus blocks and x represents an element of the set of B.

2. The motion vector detection device of claim 1, wherein the motion vector determination part determines the motion vector for the focus block among the reference blocks in which the difference between the matching errors and the least matching error is within the threshold value and in which the matching error locally becomes the smallest.

3. The motion vector detection device of claim 1, wherein the correction vector calculation part calculates, as the correction vector, one of an average vector and a median vector of the motion vectors detected for the reference blocks.

4. The motion vector detection device of claim 1, wherein the threshold calculation part calculates, as the threshold value, a value that is a variation of the matching errors multiplied by a constant.

5. The motion vector detection device of claim 1, wherein the threshold calculation part calculates, as the threshold value, a value that a difference between the maximum value and the minimum value of the plurality of matching errors is multiplied by a constant.

6. The motion vector detection device of claim 1, wherein the correction vector calculation part calculates, as the correction vector, one of an average vector and a median vector of the motion vectors in the reference blocks, the motion vectors being assigned to blocks which are around them and correspond to the focus block in a past frame, the motion vectors in the reference blocks having been calculated in the past frame, the past frame being defined as being calculated at a different time from the current frame.

7. A motion vector detection device, comprising:
a processor; and
a memory containing a program, the program, when executed, causing the processor to function as:
a matching error calculation part that calculates a plurality of matching errors between a focus block in a current frame and each of a plurality of reference blocks in a reference frame;

a least matching error calculation part that calculates a least matching error from among the plurality of matching errors;

a threshold calculation part that calculates a threshold value that increases as a variation of the plurality of matching errors becomes greater;

a correction vector calculation part that calculates a correction vector from motion vectors detected in the other focus blocks from which motion vectors were detected prior to the focus block of the current frame; and a motion vector determination part that determines, as a motion vector for the focus block, a relative position vector in a block in which the relative position vector with respect to the focus block is the closest to the correction vector, the block being selected from among the reference blocks in which a difference between the plurality of matching errors and the least matching error is within the threshold value, wherein the matching error calculation part calculates each of the plurality of matching errors as follows:

$$D(u) = \sum_{x \in B} |I_{ref}(x+u) - I_{src}(x)|$$

where D(u) represents a matching error with respect to motion vector u, $I_{ref}$ represents the current frame, $I_{src}$ represents the reference frame, B represents a set of position vectors indicating pixel positions in the focus blocks, and x represents an element of the set of B, and the motion vector determination part calculates the motion vector as follows:

$$u_{out} = \operatorname*{argmin}_{u \in C_E} \|u - u_{amd}\|$$

where $u_{out}$ represents the motion vector, $u_{amd}$ represents the correction vector calculated by the correction vector calculation part, and $C_E$ represents a set of candidate vectors respectively corresponding to a plurality of candidate blocks.

8. An apparatus for detecting a motion vector, comprising:
a processor; and
a memory containing a program, the program, when executed, causing the processor to function as:
a matching error calculation part that calculates a plurality of matching errors between a focus block in a current frame and each of a plurality of reference blocks in a reference frame;

a least matching error calculation part that calculates a least matching error from among the plurality of matching errors;

a threshold calculation part that calculates a threshold value that increases as a variation of the plurality of matching errors becomes greater;

a correction vector calculation part that calculates a correction vector from motion vectors detected in the other focus blocks from which motion vectors were detected prior to the focus block of the current frame; and a motion vector determination part that determines, as a motion vector for the focus block, a relative position vector in a block in which the relative position vector with respect to the focus block is the closest to the correction vector, the block being selected from among the reference blocks in which a difference between the plurality of matching errors and the least matching error is within the threshold value, wherein the matching error calculation part calculates each of the plurality of matching errors as follows:

$$D(u) = \sum_{x \in B} |I_{ref}(x+u) - I_{src}(x)|$$

where D(u) represents a matching error with respect to motion vector u, $I_{ref}$ represents the current frame, $I_{src}$, represents the reference frame, B represents a set of position vectors indicating pixel positions in the focus blocks and x represents an element of the set of B.

9. The motion vector detection device of claim 7, wherein the motion vector determination part determines the motion vector for the focus block among the reference blocks in which the difference between the matching errors and the least matching error is within the threshold value and in which the matching error locally becomes the smallest.

10. The motion vector detection device of claim 7, wherein the correction vector calculation part calculates, as the correction vector, one of an average vector and a median vector of the motion vectors detected for the reference blocks.

11. The motion vector detection device of claim 7, wherein the threshold calculation part calculates, as the threshold value, a value that is a variation of the matching errors multiplied by a constant.

12. The motion vector detection device of claim 7, wherein the threshold calculation part calculates, as the threshold value, a value that a difference between the maximum value and the minimum value of the plurality of matching errors is multiplied by a constant.

13. The motion vector detection device of claim 7, wherein the correction vector calculation part calculates, as the correction vector, one of an average vector and a median vector of the motion vectors in the reference blocks, the motion vectors being assigned to blocks which are around them and correspond to the focus block in a past frame, the motion vectors in the reference blocks having been calculated in the past frame, the past frame being defined as being calculated at a different time from the current frame.

14. The apparatus of claim 8, wherein
the motion vector determination part calculates the motion vector as follows:

$$u_{out} = \underset{u \in C_\varepsilon}{\mathrm{argmin}} \|u - u_{amd}\|$$

where $u_{out}$ represents the motion vector, $u_{amd}$ represents the correction vector calculated by the correction vector calculation part, and $C_\varepsilon$ represents a set of candidate blocks selected from among the plurality of reference blocks.

15. An apparatus for detecting a motion vector, comprising:
a processor; and
a memory containing a program, the program, when executed, causing the processor to function as:
a matching error calculation part that calculates a plurality of matching errors between a focus block in a current frame and each of a plurality of reference blocks in a reference frame;
a correction vector calculation part that calculates a correction vector from motion vectors detected in the other focus blocks from which motion vectors were detected prior to the focus block of the current frame; and
a motion vector determination part that determines a motion vector for the focus block as follows:

$$u_{out} = \underset{u \in C_\varepsilon}{\mathrm{argmin}} \|u - u_{amd}\|$$

where $u_{out}$ represents the motion vector, $u_{amd}$ represents the correction vector calculated by the correction vector calculation part, and $C_\varepsilon$ represents a set of candidate vectors respectively corresponding to one or more candidate blocks, the one or more candidate blocks being selected from among the plurality of reference blocks based on the matching errors.

16. The apparatus of claim 15, wherein
the program, when executed, further causes the processor to function as:
a least matching error calculation part that calculates a least matching error from among the plurality of matching errors; and
a threshold calculation part that calculates a threshold value that increases as a variation of the plurality of matching errors becomes greater; and
the one or more candidate blocks are selected based on whether a difference between the plurality of matching errors and the least matching error is within the threshold value.

17. The apparatus of claim 15, wherein
the motion vector determination part determines the motion vector for the focus block among the reference blocks in which the difference between the matching errors and the least matching error is within the threshold value and in which the matching error locally becomes the smallest.

18. The apparatus of claim 15, wherein
the correction vector calculation part calculates, as the correction vector, one of an average vector and a median vector of the motion vectors detected for the reference blocks.

19. The apparatus of claim 15, wherein
the threshold calculation part calculates, as the threshold value, a value that is a variation of the matching errors multiplied by a constant.

20. The apparatus of claim 15, wherein
the threshold calculation part calculates, as the threshold value, a value that a difference between the maximum value and the minimum value of the plurality of matching errors is multiplied by a constant.

21. The apparatus of claim 15, wherein
the correction vector calculation part calculates, as the correction vector, one of an average vector and a median vector of the motion vectors in the reference blocks, the motion vectors being assigned to blocks which are around them and correspond to the focus block in a past frame, the motion vectors in the reference blocks having been calculated in the past frame, the past frame being defined as being calculated at a different time from the current frame.

22. The apparatus of claim 15, wherein
the matching error calculation part calculates each of the plurality of matching errors as follows:

$$D(u) = \sum_{x \in B} |I_{ref}(x+u) - I_{src}(x)|$$

where D(u) represents a matching error with respect to motion vector u, $I_{ref}$ represents the current frame, $I_{src}$, represents the reference frame, B represents a set of position vectors indicating pixel positions in the focus blocks, and x represents an element of the set of B.

* * * * *